US012748987B2

(12) United States Patent
Lantzman

(10) Patent No.: US 12,748,987 B2
(45) Date of Patent: Sep. 29, 2026

(54) SYSTEMS AND METHODS FOR RULE-BASED MACHINE LEARNING MODEL PROMOTION

(71) Applicant: JPMORGAN CHASE BANK, N.A., New York, NY (US)

(72) Inventor: Eyal Lantzman, Cambridge (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 1245 days.

(21) Appl. No.: 17/653,596

(22) Filed: Mar. 4, 2022

(65) Prior Publication Data

US 2023/0281482 A1 Sep. 7, 2023

(51) Int. Cl.
*G06F 11/3698* (2025.01)
*G06F 11/3604* (2025.01)
*G06N 5/02* (2023.01)

(52) U.S. Cl.
CPC ......... *G06N 5/027* (2013.01); *G06F 11/3604* (2013.01); *G06F 11/3698* (2025.01)

(58) Field of Classification Search
None
See application file for complete search history.

(56) References Cited

U.S. PATENT DOCUMENTS 12,333,468 B1* 6/2025 Huang ................. G06Q 10/067
2011/0179280 A1* 7/2011 Imrey ....................... G06F 8/71 707/755
2013/0031416 A1* 1/2013 Buckhurst ........... G06F 11/3698 714/38.1
2015/0301840 A1* 10/2015 Goetz ....................... G06F 8/24 717/166
2016/0094635 A1* 3/2016 Kannan ............... H04L 41/0893 709/203
2019/0370162 A1* 12/2019 Mandal ............... G06F 11/3688
2021/0019665 A1* 1/2021 Gur ......................... G06N 20/20
2021/0081837 A1* 3/2021 Polleri ...................... G06F 8/30
2022/0101180 A1* 3/2022 Bhide .................. G06V 10/757
2022/0239736 A1* 7/2022 Magana Perdomo ....................... G06F 11/2028
2022/0276953 A1* 9/2022 Padala ................ G06F 11/3433
2022/0398078 A1* 12/2022 Segler ....................... G06F 8/30
2023/0054760 A1* 2/2023 Kiselev ..................... G06F 8/10
2023/0139803 A1* 5/2023 Sabini .................... G06N 20/00 706/12

(Continued)

*Primary Examiner* — Jason D Mitchell
(74) *Attorney, Agent, or Firm* — GREENBERG TRAURIG LLP

(57) ABSTRACT

Systems and methods for rule-based machine learning model promotion are disclosed. In accordance with aspects, a method may include providing a rules engine that defines a software object model, and an evaluation framework. A model metadata file having a format that is based on the software object model can be generated. The model metadata file can store metadata associated with the model. A model rule file having a format based on the software object model and that defines rule criteria for evaluating the metadata can be generated. The rules engine can instantiate a software object based on the software object model and parse the model rule file to determine rule criteria and parse the model metadata file to determine a parameter value associated with the rule criteria. The rules engine can evaluate the parameter value against a rule and provide a promotion decision for the model.

16 Claims, 3 Drawing Sheets

(56) References Cited

U.S. PATENT DOCUMENTS

2023/0176961 A1* 6/2023 Hong .................... G06F 11/079
717/124

* cited by examiner

SYSTEMS AND METHODS FOR RULE-BASED MACHINE LEARNING MODEL PROMOTION

BACKGROUND

1. Field of the Invention

Aspects are generally related to systems and methods for a rule-based approval process for promoting machine learning (ML) models from a training environment to a production environment.

2. Description of the Related Art

Large amounts of metadata are generated and collected during the development and training of machine learning models. Systems, such as model governance systems, store the generated metadata and various other types of information about a machine learning model that is generated through the development and training phases of model creation. The collective data and information that is generated and stored while a ML model is being developed and trained is generally the basis for determining the point at which a machine learning model is prepared to be deployed to a production environment. The promotion process, however, is a very manual process. In order to allow for scalability and efficiency gains in model creation, automation in determining a model's ability to perform adequately in a production environment would be valuable to enterprise-level organizations.

SUMMARY

In some aspects, the techniques described herein relate to a method for rule-based promotion of a machine learning model, including: providing a rules engine, wherein the rules engine defines a software object model, and an evaluation framework; generating a model metadata file, wherein a format of the model metadata file is based on the software object model, wherein the model metadata file stores metadata associated with the machine learning file, wherein the metadata includes a parameter value, and wherein the parameter value describes a characteristic of the machine learning model; generating a model rule file, wherein a format of the model rule file is based on the software object model, and wherein the model rule file defines rule criteria for evaluating the metadata; instantiating, by the rules engine, a software object based on the software object model; parsing, by the rules engine, the model rule file to determine the rule criteria; parsing, by the rules engine, the model metadata file to determine that the parameter value is associated with the rule criteria; setting, by the rules engine, the value of an operand declared in the software object to the parameter value; performing, by the rules engine, an evaluation of the operand against an operator indicated by the rule criteria; and decisioning a promotion decision of the model based on the evaluation.

In some aspects, the techniques described herein relate to a method, wherein the rules engine is incorporated into a release pipeline.

In some aspects, the techniques described herein relate to a method, wherein the machine learning model is submitted to the release pipeline prior to being released to a production environment.

In some aspects, the techniques described herein relate to a method, wherein the evaluation operation is a boolean function and returns a boolean value.

In some aspects, the techniques described herein relate to a method, wherein the boolean value returns as true.

In some aspects, the techniques described herein relate to a method, wherein the boolean value returns false, and, as a result of the false return value, the release pipeline is halted.

In some aspects, the techniques described herein relate to a method, wherein the results of the evaluation are written to a log file.

In some aspects, the techniques described herein relate to a method, wherein the operand is declared as a primitive data type in the software object.

In some aspects, the techniques described herein relate to a method, wherein the rules engine converts the parameter value to the primitive data type.

In some aspects, the techniques described herein relate to a method, wherein the model rule file is extensible, and wherein the model rule file is a JSON document.

In some aspects, the techniques described herein relate to a system for rule-based promotion of a machine learning model, including: at least computer including a processor, wherein the processor is configured to: a rules engine executing on the at least one computer, wherein the rules engine defines a software object model, and an evaluation framework; a model metadata file, wherein a format of the model metadata file is based on the software object model, wherein the model metadata file stores metadata associated with the machine learning model, wherein the metadata includes a parameter value, and wherein the parameter value describes a characteristic of the machine learning model; a model rule file, wherein a format of the model rule file is based on the software object model, and wherein the model rule file defines rule criteria for evaluating the metadata; and wherein the rules engine is configured to: instantiate a software object based on the software object model; parse the model rule file to determine the rule criteria; parse the model metadata file to determine that the parameter value is associated with the rule criteria; set the value of an operand declared in the software object to the parameter value; perform an evaluation of the operand against an operator indicated by the rule criteria; and provide a promotion decision of the model based on the evaluation.

In some aspects, the techniques described herein relate to a system, wherein the rules engine is incorporated into a release pipeline.

In some aspects, the techniques described herein relate to a system, wherein the machine learning model is submitted to the release pipeline prior to being released to a production environment.

In some aspects, the techniques described herein relate to a system, wherein the evaluation operation is a boolean function and returns a boolean value.

In some aspects, the techniques described herein relate to a system, wherein the boolean value returns as true.

In some aspects, the techniques described herein relate to a system, wherein the boolean value returns false, and, as a result of the false return value, the release pipeline is halted.

In some aspects, the techniques described herein relate to a system, wherein the results of the evaluation are written to a log file.

In some aspects, the techniques described herein relate to a system, wherein the operand is declared as a primitive data type in the software object.

In some aspects, the techniques described herein relate to a system, wherein the rules engine converts the parameter value to the primitive data type.

In some aspects, the techniques described herein relate to a system, wherein the model rule file is extensible, and wherein the model rule file is a JSON document.

DETAILED DESCRIPTION

Figure 1:
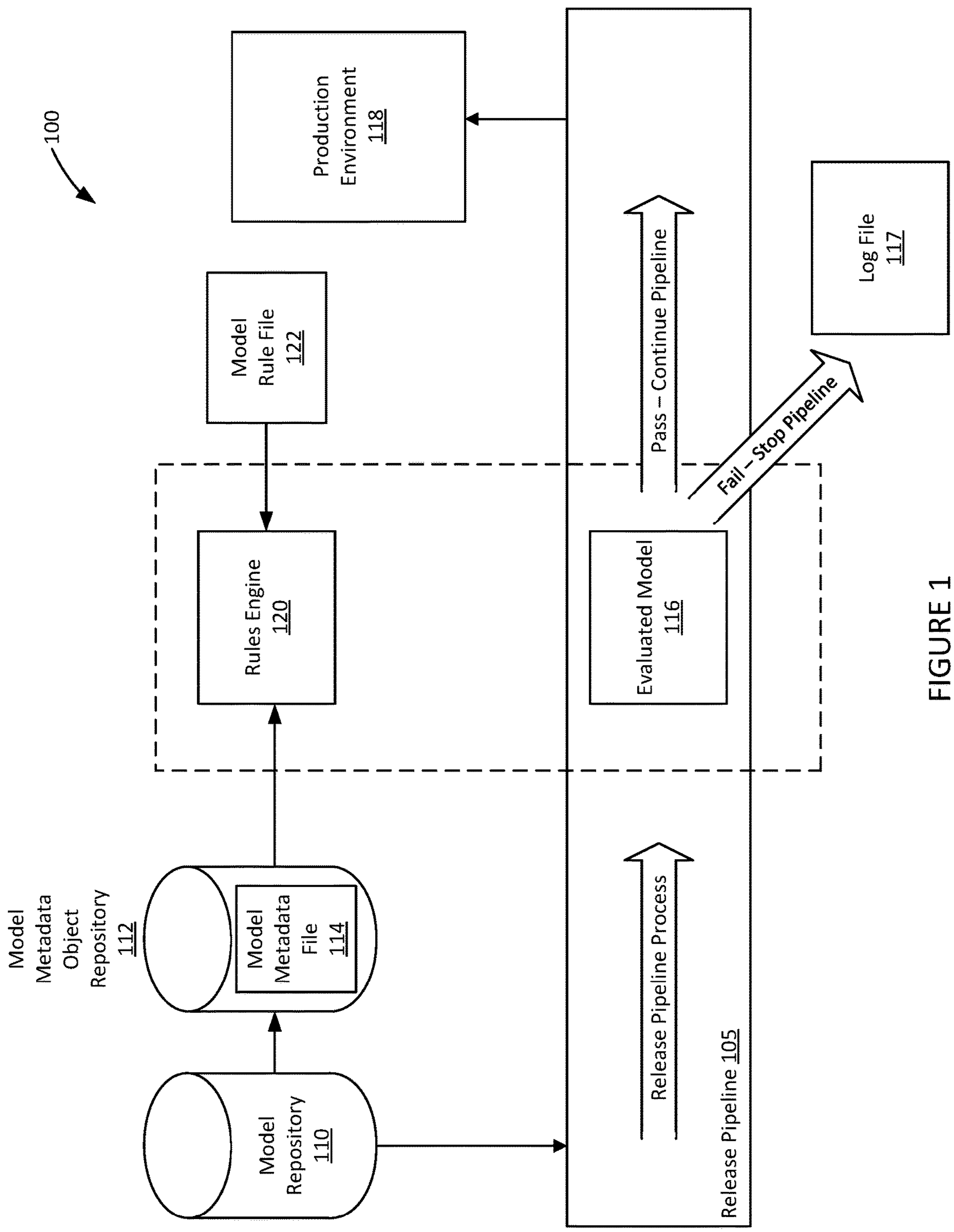
FIG. 1 is a block diagram of a system for rule-based machine learning model promotion, in accordance with aspects.

Aspects are generally related to systems and methods for a rule-based approval process for promoting machine learning (ML) models from a training/development environment to a production environment.

Organizations that employ machine learning (ML) models in projects must ensure that the ML models are properly developed and appropriately trained to produce acceptable results for business uses. Generally, to this end, a data scientist undertakes to develop a ML model through training and other development techniques. As the model matures through the training process, less supervision from the data scientist is required as the model "learns" from a training data set.

A model owner is also generally assigned by organizations to evaluate and verify, from a business perspective, that the ML model, as developed and trained, will achieve the business needs for which it is being deployed. To verify these requirements, a model owner can create a set of rules to gauge the model against in order to determine whether the model is ready for deployment into the production environment. These rules can define different requirements for different models, the adherence to which can be an indication that a given model is adequately developed and trained for use in a production environment.

In accordance with aspects, metadata about a model and its training process can be captured. A well-defined and standardized format can be employed to capture and store model metadata. Businesses can employ a standardized tool that automatically captures, or receives from data scientists, development, and training process metadata. The file type can include that of a machine-readable file format, such as a JSON file, an XML file, etc.

Exemplary model metadata that can be captured includes: the environment the model is being developed in and will run in; credentials of the data scientist developing and training the model; credentials of the business owner of the model; the training data source; training metrics; types of data used in the training process; a codebase that was used in the training process; the dependencies that were used in the training process; source control system information; model documentation that was generated during the development and training process; log files created during the training process; the training configuration file or data from therein; training commands; training frameworks; a set of values used as hyperparameters for training of the model; loading modules and loading parameters used to load the model and generate inferences; etc.

In accordance with aspects, any metadata produced in the development and training process of a ML model can be captured for evaluation, and the above list is not meant to be limiting. As used herein, a model metadata file refers to a standardized and well-defined, machine readable file for collecting and storing metadata generated in the development and training process of a ML model.

A model metadata file can be formatted so that it corresponds to a software object model, such that the model metadata file can be parsed, and the values can be used as values of data fields/attributes of an instantiated software object. In some aspects, such data fields can be primitive data types that can be used as operands in operations that evaluate primitive data types and return a boolean value (i.e., true or false, 1 or 0, etc.).

Aspects described herein can employ an extensible set of rules that can be applied against metadata collected during the development and training of a ML model through automation as the model passes through a deployment, or release pipeline of a deploying organization. If, based on the collected metadata, the model adheres to the supplied set of rules, the model can be allowed to proceed through the release pipeline toward the production environment. If, however, the model does not adhere to the supplied set of rules, the release pipeline can be halted, and the results of the evaluation can be logged for further assessment.

A supplied set of rules for evaluating a ML model can also be provided in a standardized, well-defined and machine-readable format. As with a model metadata file, a rules file format can be defined based on a software object model of a rules engine. As used herein, a model rule file refers to a standardized, well-defined, and machine-readable file format for inclusion and storage of a set of rules against which a ML model can be evaluated. A model rule file can also be formatted so that it can be parsed, and the values can be used as values of data fields/attributes of an instantiated software object. Such data fields can be primitive data types that can be used as operands in operations that evaluate primitive data types. Exemplary model rule file types include JSON, XML, etc.

Aspects of a rules engine or module can be deployed as a software development kit (SDK) that allows for the customized specification of rules that will be applied to a ML model. A library, including a language model that allows for the provision of rules that, in turn, allow for determining that a ML model that has been trained to a given platform possesses a minimum set of metrics within a defined range, can be provided. These metrics, which can be captured in a model metadata file, can be the basis for promotion of the model to a production environment when evaluated against a set of rules, which can be captured in a model rule file.

In accordance with aspects, a rules engine can comprise a software program executed by hardware. Such hardware can be, e.g., part of an enterprise release pipeline, and the release pipeline process can include process steps that a ML model undergoes in order to be deployed into a production environment. A rules engine can provide a step, or a set, or subset, of steps in the release pipeline process.

A rules engine can include software instructions that, when executed by a processing machine (e.g., a microprocessor in a server) cause the evaluation of metadata values captured in a model metadata file to be evaluated against a set of rules captured in a model rule file, where the rules specify acceptable values of the model metadata included in the model metadata file.

FIG. 1 is a block diagram of a system for rule-based machine learning model promotion, in accordance with aspects. System 100 includes release pipeline 105. Release pipeline 105 represents a deployment pipeline for ML models. Release pipeline 105 may be, e.g., a deployment pipeline of an enterprise-level organization. Release pipeline 105 can include a series of steps that a ML model must undergo in order to be released to, and implemented in, a production environment. One step, or subseries of steps can include steps carried out by a rules engine.

System 100 further includes model repository 110, model metadata object repository 112, production environment 118, and rules engine 120. Model repository 110 can be a any suitable storage container and/or technique for storing ML models throughout the development and training process. Model metadata object repository 112 stores model metadata files such as model metadata file 114. During development and training, ML model metadata (such as described above) can be captured and stored in model metadata files. These model metadata files can be stored in model metadata object repository 112 for use in the deployment process.

As depicted in FIG. 1, a ML model can be placed in release pipeline 105 near the beginning of the deployment process to production environment 118. Evaluated model 116 is a ML model that has been released to release pipeline 105 from model repository 110. Evaluated model 116 can pass through various processes that define release pipeline 105. In accordance with embodiments, processing, and evaluation of evaluated model 116 by rules engine 120 can be defined as a part of release pipeline 105.

In accordance with aspects, the definition and format of a model rule file and a model metadata file can be based on a software object model defined by a rules engine. That is, a model rule file and a model metadata file can include parameters that correspond to attributes of a software object that can be instantiated by a rules engine. Accordingly, the rules engine can populate constant and/or variable data fields declared by the software object with corresponding values from the model rule file and the model metadata file.

A rules engine may be configured to parse a model rule file associated with a ML model in a release pipeline to determine string values for respective rule criteria that have been defined for a given ML model. The rules engine may instantiate one or more software objects based on an object model defined by the rules engine and use the rule criteria values as typed or primitive data values to populate constants and/or field/attribute variables declared by the instantiated object or objects. Likewise, the rules engine can parse a model metadata file to determine string values for respective metadata parameters defined in the model metadata file. The rules engine can also convert these determined values into typed or primitive data types and assign the converted values as values of constants and/or variables declared by the instantiated object or objects.

In accordance with embodiments, values determined from a model rule file and a model metadata file can be used as operands in operations defined by a rules engine. The operations can be defined in functions that return a boolean value (e.g., true or false). In aspects, values parsed from a model rule file and a model metadata file can be converted from string values to primitive data values and used as operands in primitive boolean operations defined by the rules engine. Operations can include binary operations, unary operations, and/or multi-operand operations.

Exemplary binary boolean operations include "equals" (e.g., ==), does not equal (e.g., !=), "less than" (e.g., <), "less than or equal to" (e.g., <=), "greater than" (e.g., >), "greater than or equal to" (e.g., >=), "in-list," "in-set," "has-key," "and," and "or." A binary boolean operation evaluates two operands and returns "true" or "false" based on the evaluation.

Exemplary unary boolean operations include "is-null," "is-null-or-empty," "is-not-null-or-empty," and "is-not-null." Unary boolean operations evaluate a single operand and return "true" or "false" based on the evaluation.

Exemplary multi-operand boolean operations include "all," "none," and "any." Multi-operand boolean operations can evaluate multiple operands, e.g., from a list, and return "true" or "false" based on the evaluation.

In accordance with aspects, a model metadata file and model rule file that are defined according to a model object of a rules engine allow for easy customization to a model rule file. A model owner can define a rule associated with a metadata metric that the model owner wishes to check a promotion process. The rule can be included in a model rule file in a prescribed format. For example, the prescribed format can include a metadata metric to be checked, and a type of operation with which to check the value.

An exemplary rule may indicate a precision level of an evaluated model that is acceptable for promotion to a production environment. For instance, a precision rule may indicate that a model's observed precision scores be greater than 0.80 and less than 0.95 (precision being the number of false positives a model produces). A rules engine can parse the rule from a model rule file, which can indicate that the rule will require an evaluation of the precision values captured in a model metadata file. The rules engine can build the operation based on the values for the precision metric found in the model rules file. An exemplary operation for the precision rule noted above may be:

$$\text{boolean } precRule = ((precVal >= 0.80) \text{ and } (precVal <= 0.95))$$

where the precVal variable is the precision score for the evaluated model that has been captured in the model metadata file associated with the evaluated model, the values 0.80 and 0.95 are specified in the precision rule of an associated model rule file, and the boolean variable precRule is returned after the operation with a value of "true" or "false" depending on the outcome of the evaluation.

Another exemplary rule defined in a model rule document can check that a training data source has been specified and recorded in an associated model metadata file of an evaluated model. The rule may indicate that the operand (i.e., the rule value) is a list, or an array, of data, and that the operator is the unary operator "is-not-null-or-empty." A rules engine can parse the rule (from a model rule file) to determine the data type, the associated parameter value from a model metadata file, and the operator. Based on the rule, the rules engine may call, e.g., a getTrainingSourceMetadata( ) method which attempts to extract, from the model metadata file a data.train value. This method may return a list or array. The rules engine can then take the returned list/array value and evaluate it using the unary operator "is-not-null-or-empty" and return "true" if there is something in the list. Alternatively, the evaluation function can return "false" if the list is null or empty. This exemplary test assures, from a data lineage perspective, that the training data lineage that was used to train the associated evaluated model has been captured.

A rules engine can check the format of a rule specified in a model rule file. The format can be based on a software object model defined in the rules engine. The rules engine can be configured to stop processing and alert a system administrator with an error message if a rule in the rules document does not conform to the specified format/definition.

In accordance with aspects, a model rule document can include a hierarchy of rules. The hierarchy can begin at a root node, and evaluation can begin at the root node and proceed through the hierarchy defined in the model rule file. All the operands which are defined at the root node must evaluate to "true" in order to move to the next level of the hierarchy. This creates an evaluation tree based on the root criteria.

Figure 2:
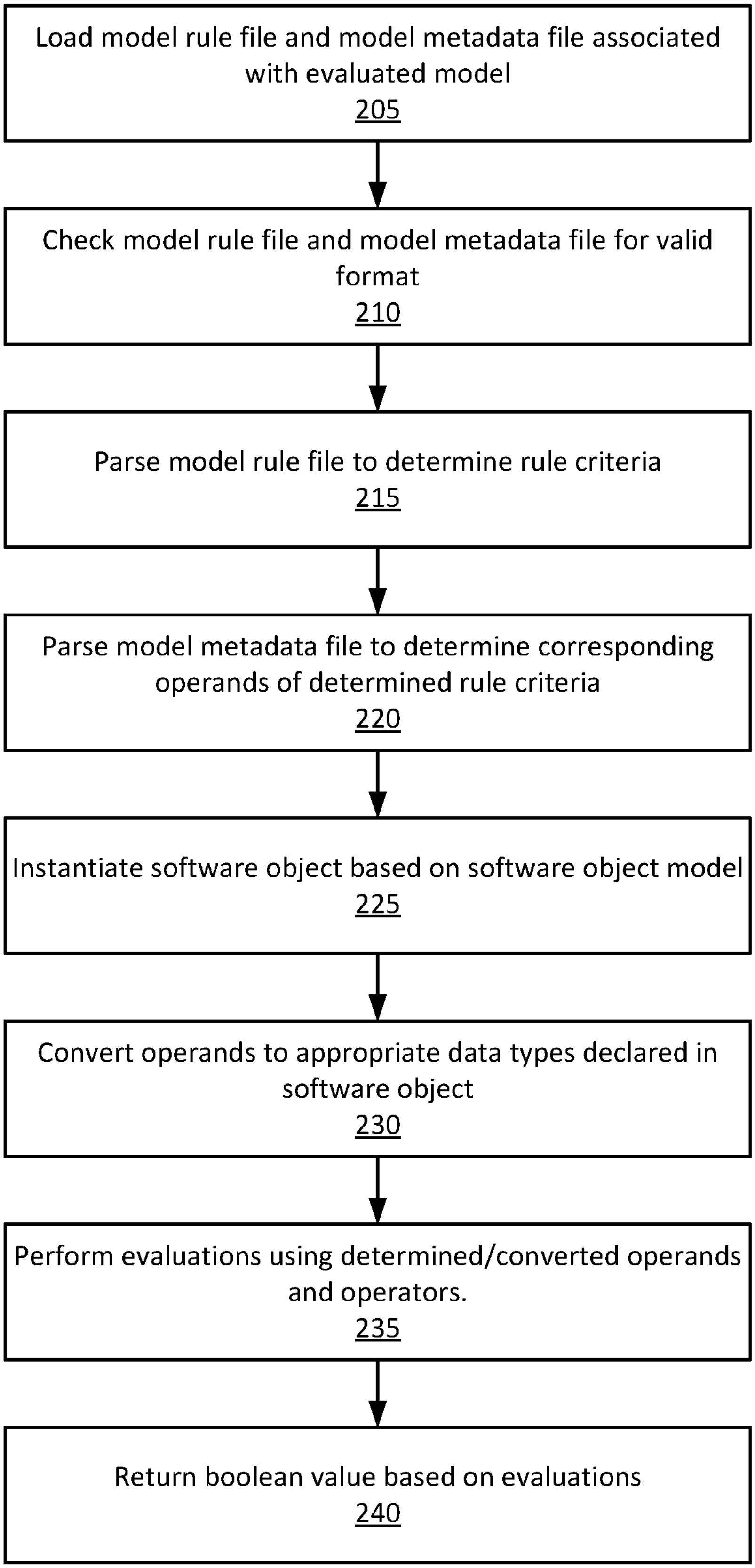
FIG. 2 is a logical flow of a rules engine, in accordance with aspects.

FIG. 2 is a logical flow of a rules engine, in accordance with aspects. At step 205, the rules engine can load a model rule file and a model metadata file associated with a ML model that is being evaluated. The ML model (the evaluated model) may have been submitted to a release pipeline for deploying ML models to a production environment. The associated files can of a machine-readable type, such as a JSON file, so that the rules engine can parse/process the files. As a part of the deployment process, the model rule file associated with the evaluated model may have been indicated. The model rule file may indicate, in turn, the model metadata file associated with the evaluated model. Alternatively, the associated model metadata file can also be specified as a part or the deployment process.

At step 210, the rule engine can check for the appropriate format of the model rule file and the model metadata file. The loaded file can be checked for adherence to the schema of a software object model defined by the rules engine. The rules engine can be configured to end the evaluation procedure (and the release pipeline) if either of the files do not adhere to the defined format.

At step 215, the rules engine can parses the model rule file to determine rule criteria. The rule criteria can include a specified operator and specified rule values that can be used as operands in an evaluation carried out by the rules engine.

At step 220, after identifying the specified rule criteria, the rules engine can parse the model rule file to determine values that correspond to the rule criteria. The values can represent operands that can be used in the evaluation operations specified in the model rules file.

At step 225, the rules engine can instantiate one or more software objects based on software object models defined. The instantiated software object can include declared field/attribute values, and at step 230, the rules engine can convert the determined values from the model rule file and the model metadata file to corresponding data type of a relevant field and set the value of the field to the determined values for use in evaluation operations.

At step 235, the rules engine can perform the evaluations specified in the model rules file. The defined object model may include evaluation expressions, formulations and/or functions/methods for use with the field/attribute variable values, which can be set to the values retrieved from the model rule file and/or the model metadata file. These expressions, formulations and functions can operate as an evaluation framework defined by a rules engine. At step 240, the evaluations can return a boolean value based on the outcome of the evaluations.

In accordance with aspects, a rules engine can be configured to halt a release pipeline and write results to a log file if all rules specified in a model rule document do not return "true" values based on the evaluation of the rules with respect to an associated model metadata file.

Referring back to FIG. 1, model metadata file 114 and model rule file 122 can both be associated with evaluated model 116. Rules engine 120 may be a software program/module configured to execute on hardware allocated to system 100. Accordingly, as part of release pipeline 105, rules engine 120 can be configured to parse both model metadata file 114 and model rule file 122, as described above. As further described above, model metadata file 114 can include values of various metadata parameters defined in model metadata file 114. Likewise, model rule file 122 can include values for various rule criteria defined in model rule file 122. Rules engine 120 can parse these files and use the respective determined values as values for constants and/or variables declared in an object model defined by rules engine 120.

Rules engine 120 can perform evaluations based on rules criteria from model rule file 122, and parameter values from model metadata file 114. The evaluation functions can be configured to return boolean values based on the outcome of the evaluations. In accordance with aspects, if all rule criteria specified in model rule file 122 evaluate to "true" based on associated model metadata file 114 and evaluations performed by rules engine 120, evaluated model 116 can continue with release pipeline 105 and, ultimately, be deployed to production environment 118. If, however, any rule criteria evaluate to "false," rules engine 120 can halt release pipeline 105, and write the results of the evaluations to log file 117 for inspection by a user such as the model owner, the data scientist, a system administrator, etc.

Figure 3:
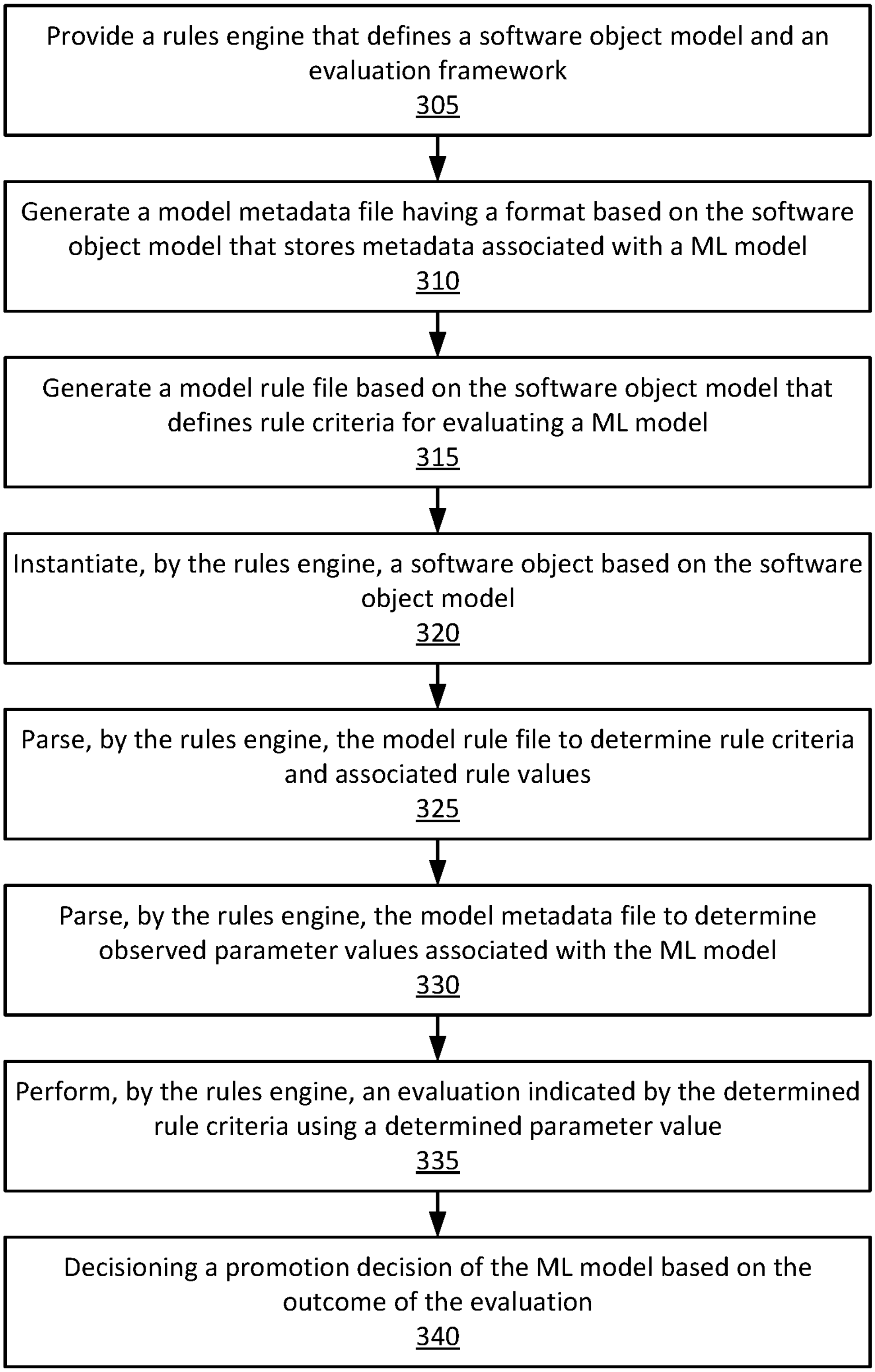
FIG. 3 is a logical flow for rule-based machine learning model promotion, in accordance with aspects.

FIG. 3 is a logical flow for rule-based machine learning model promotion, in accordance with aspects. At step 305, a rules engine is provided that defines a software object model and an evaluation framework. At step 310, a model metadata file having a format based on the software object model and that stores metadata associated with a ML model is generated. At step 315, a model rule file based on the software object model and that defines rule criteria for evaluating a ML model is generated. At step 320, the rules engine instantiates a software object based on the software object model. The software object model can include an evaluation framework that can utilize variable values defined in the software object model to evaluate the variable values.

With continued reference to FIG. 3, at step 325, the rules engine can parse the model rule file to determine rule criteria and any associated rule values. At step 330, the rules engine can parse the model metadata file to determine observed parameter values associated with the determined rule criteria. That is, the parameter values are model metadata collected about the ML model, and that are associated with the determined rule criteria. At step 335, the rules engine can perform the evaluation indicated by the determined rule criteria and using the corresponding determined parameter values. At step 340, the rules engine can decision a promotion decision of the ML model based on the outcome of the evaluations. In accordance with aspects, if all evaluations return a value of "true," the evaluated ML model can continue to deployment. If, on the other hand, an of the evaluations return a value of "false," the pipeline can be halted, and the results written to a log file.

The various processing steps and/or data flows depicted in the figures and described in greater detail herein may be accomplished using some or all of the system components also described herein. In some implementations, the logical flows described by, and in conjunction with, the figures may be performed in different sequences and various steps may be omitted. Additional steps may be performed along with some or all of the steps shown in the depicted flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and/or in the form of electronic circuitry.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention.

Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method for rule-based promotion of a machine learning model, comprising:

providing a rules engine, wherein the rules engine defines a software object model, and an evaluation framework;

generating a model metadata file, wherein a format of the model metadata file is based on the software object model, wherein the model metadata file stores metadata associated with the machine learning model, wherein the metadata includes a parameter value, and wherein the parameter value describes a characteristic of the machine learning model;

generating a model rule file, wherein a format of the model rule file is based on the software object model, and wherein the model rule file defines rule criteria for evaluating the metadata;

checking, by the rules engine, adherence of the model rule file and the model metadata file to a schema of the software object;

instantiating, by the rules engine, a software object based on the software object model;

parsing, by the rules engine, the model rule file to determine the rule criteria;

parsing, by the rules engine, the model metadata file to determine that the parameter value is associated with the rule criteria;

setting, by the rules engine, the value of an operand declared in the software object to the parameter value;

performing, by the rules engine, an evaluation according to a hierarchy of the rule criteria that begins at a root node such that the operand defined at the root node must evaluate before evaluating a next level of the hierarchy, the evaluation comprising evaluating the operand against an operator indicated by the rule criteria; and decisioning a promotion decision of the model based on the evaluation.

2. The method of claim 1, wherein the rules engine is incorporated into a release pipeline.

3. The method of claim 2, wherein the machine learning model is submitted to the release pipeline prior to being released to a production environment.

4. The method of claim 3, wherein the evaluation operation is a boolean function and returns a boolean value.

5. The method of claim 4, wherein the boolean value returns as true.

6. The method of claim 4, wherein the boolean value returns false, and, as a result of the false return value, the release pipeline is halted.

7. The method of claim 6, wherein the results of the evaluation are written to a log file.

8. The method of claim 1, wherein the operand is declared as a primitive data type in the software object, wherein the rules engine converts the parameter value to the primitive data type, wherein the model rule file is extensible, and wherein the model rule file is a JSON document.

9. A system for rule-based promotion of a machine learning model, comprising:

at least computer including a processor, wherein the processor is configured to:

a rules engine executing on the at least one computer, wherein the rules engine defines a software object model, and an evaluation framework, wherein the rules engine checks adherence of the model rule file and the model metadata file to a schema of the software object;

a model metadata file, wherein a format of the model metadata file is based on the software object model, wherein the model metadata file stores metadata associated with the machine learning model, wherein the metadata includes a parameter value, and wherein the parameter value describes a characteristic of the machine learning model;

a model rule file, wherein a format of the model rule file is based on the software object model, and wherein the model rule file defines rule criteria for evaluating the metadata; and wherein the rules engine is configured to:

instantiate a software object based on the software object model;

parse the model rule file to determine the rule criteria;

parse the model metadata file to determine that the parameter value is associated with the rule criteria;

set the value of an operand declared in the software object to the parameter value;

perform an evaluation according to a hierarchy of the rule criteria that begins at a root node such that the operand defined at the root node must evaluate before evaluating a next level of the hierarchy, the evaluation comprising evaluating the operand against an operator indicated by the rule criteria; and provide a promotion decision of the model based on the evaluation.

10. The system of claim 9, wherein the rules engine is incorporated into a release pipeline.

11. The system of claim 10, wherein the machine learning model is submitted to the release pipeline prior to being released to a production environment.

12. The system of claim 11, wherein the evaluation operation is a boolean function and returns a boolean value.

13. The system of claim 12, wherein the boolean value returns as true.

14. The system of claim 12, wherein the boolean value returns false, and, as a result of the false return value, the release pipeline is halted.

15. The system of claim 14, wherein the results of the evaluation are written to a log file.

16. The system of claim 9, wherein the operand is declared as a primitive data type in the software object, wherein the rules engine converts the parameter value to the primitive data type, wherein the model rule file is extensible, and wherein the model rule file is a JSON document.

* * * * *